United States Patent
Agarwala et al.

(10) Patent No.: US 9,563,533 B2
(45) Date of Patent: *Feb. 7, 2017

(54) MAINTAINING COHERENT SYNCHRONIZATION BETWEEN DATA STREAMS ON DETECTION OF OVERFLOW

(71) Applicant: Texas Instruments Incorporated, Dallas, TX (US)

(72) Inventors: Manisha Agarwala, Plano, TX (US); John Johnsen, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,549

(22) Filed: Apr. 30, 2015

(65) Prior Publication Data

US 2015/0254155 A1    Sep. 10, 2015

Related U.S. Application Data

(62) Division of application No. 11/717,441, filed on Mar. 13, 2007, now Pat. No. 9,047,406, which is a division of application No. 10/301,893, filed on Nov. 22, 2002, now Pat. No. 7,219,333.

(51) Int. Cl.
| | |
|---|---|
| *G06F 9/44* | (2006.01) |
| *G06F 11/00* | (2006.01) |
| *G06F 11/34* | (2006.01) |
| *G06F 11/36* | (2006.01) |
| *G06F 11/30* | (2006.01) |

(52) U.S. Cl.
CPC ......... *G06F 11/3466* (2013.01); *G06F 11/301* (2013.01); *G06F 11/3632* (2013.01); *G06F 11/3636* (2013.01); *G06F 11/3656* (2013.01)

(58) Field of Classification Search
None
See application file for complete search history.

(56) References Cited

U.S. PATENT DOCUMENTS

| | | | | |
|---|---|---|---|---|
| 4,872,172 A | * | 10/1989 | Sanner | G06F 11/10 714/736 |
| 5,625,785 A | * | 4/1997 | Miura | G06F 11/3636 712/227 |
| 5,737,520 A | * | 4/1998 | Gronlund | G06F 11/322 714/39 |
| 5,781,561 A | * | 7/1998 | Machida | H04N 19/37 348/408.1 |

(Continued)

*Primary Examiner* — Tuan Q. Dam
*Assistant Examiner* — Zheng Wei
(74) *Attorney, Agent, or Firm* — Robert D. Marshall, Jr.; Charles A. Brill; Frank D. Cimino

(57) ABSTRACT

Trace data streams are generated for tracing target processor activity. Various trace data streams are synchronized using markers called sync points. The sync points provide a unique identifier field and a context to the data that will follow it. All trace data streams may generate a sync point with this unique identifier. These unique identifiers allow synchronization between multiple trace data streams. When multiple trace data streams are on, it is possible that the data input rate may be higher than the data output rate. If synchronization is lost in such a case, there must be a scheme to resynchronize the streams. This invention is a technique for this needed resynchronization.

17 Claims, 5 Drawing Sheets

(56) References Cited

U.S. PATENT DOCUMENTS

| | | | | |
|---|---|---|---|---|
| 6,192,499 B1* | 2/2001 | Yang | ................ | G11B 20/10527 |
| | | | | 714/785 |
| 6,301,699 B1* | 10/2001 | Hollander | ................ | G06F 21/55 |
| | | | | 717/131 |
| 6,408,409 B1* | 6/2002 | Williams | .................. | G06F 5/10 |
| | | | | 714/719 |
| 6,442,646 B1* | 8/2002 | Tsuruta | ..................... | G06F 5/08 |
| | | | | 711/109 |
| 6,704,923 B1* | 3/2004 | Gosling | ............. | G06F 9/44589 |
| | | | | 714/E11.209 |
| 6,832,302 B1* | 12/2004 | Fetzer | ..................... | G06F 21/52 |
| | | | | 711/154 |
| 7,107,581 B2* | 9/2006 | Schwabe | .................. | G06F 8/52 |
| | | | | 717/136 |
| 7,120,572 B1* | 10/2006 | Liang | .................. | G06F 9/44589 |
| | | | | 703/13 |
| 7,181,485 B1* | 2/2007 | Lau | ........................... | G06F 1/14 |
| | | | | 709/203 |
| 7,624,444 B2* | 11/2009 | Gupta | ..................... | G06F 21/55 |
| | | | | 705/51 |
| 7,712,084 B2* | 5/2010 | Beuten | ................ | G06F 11/3636 |
| | | | | 714/38.13 |
| 7,793,349 B2* | 9/2010 | Abrams | ................ | G06F 12/145 |
| | | | | 709/232 |
| 2002/0073400 A1* | 6/2002 | Beuten | ................ | G06F 11/3636 |
| | | | | 717/127 |

\* cited by examiner

MAINTAINING COHERENT SYNCHRONIZATION BETWEEN DATA STREAMS ON DETECTION OF OVERFLOW

This application: is a divisional of U.S. patent application Ser. No. 11/717,441 filed Mar. 13, 2007, which is a divisional of U.S. patent application Ser. No. 10/301,893 filed Nov. 22, 2002, now U.S. Pat. No. 7,219,333.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation, and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140.

FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

Trace data streams are generated for tracing target processor activity. Various trace data streams are synchronized using markers called sync points. The sync points provide a unique identifier field and a context to the data that will follow it. All trace data streams may generate a sync point with this unique identifier. These unique identifiers allow synchronization between multiple trace data streams.

When multiple trace data streams are on, it is possible that the data input rate may be higher than the data output rate. If synchronization is lost in such a case, there must be a scheme to resynchronize the streams. This invention is a technique for thus needed resynchronization.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
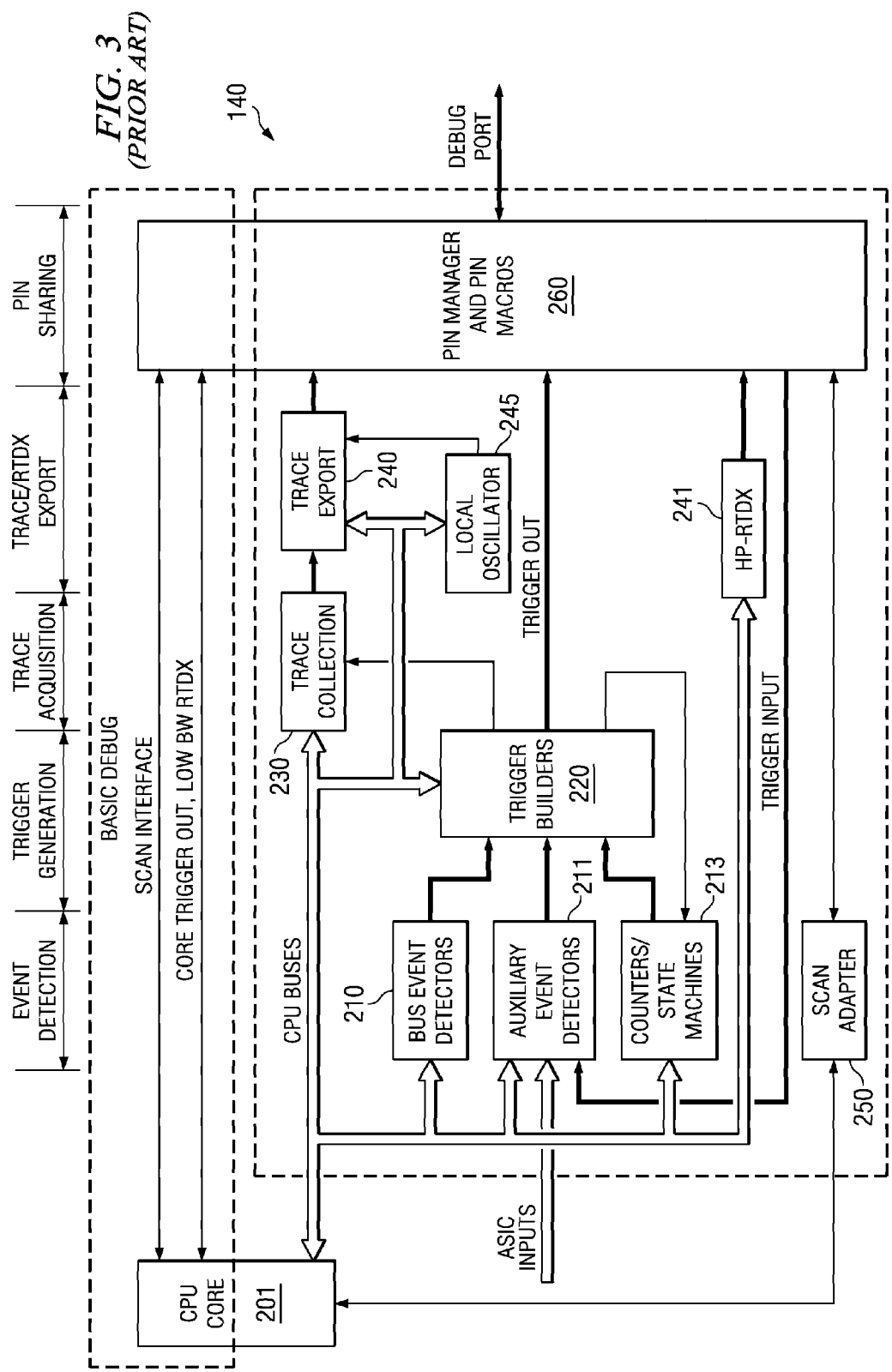
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

Consider the case of tracing processor activity and generating timing, program counter and data streams. Table 1 shows the streams generated when a sync point is generated. Context information is provided only in the program counter stream. There is no order dependency of the various streams with each other except that the sync point identifiers cannot exceed each other by more than 7. Therefore, if program counter stream has yet to send out program counter sync point of id=1, then timing stream could have sent out it's sync points with ids from 1 to 7. The timing stream cannot send out it's next sync point of 1. Within each stream the order cannot be changed between sync points.

TABLE 1

| Timing stream | PC stream | Data stream |
| --- | --- | --- |
| Timing sync point, id = 1 | PC sync point, id = 1 | Data sync point, id = 1 |
| Timing data | | |
| | PC data | Memory Data |
| Timing data | | Memory Data |
| Timing data | PC data | Memory Data |
| | PC data | |
| Timing data | | Memory Data |
| Timing sync point, id = 2 | PC sync point, id = 2 | Data sync point, id = 2 |

The program counter stream is further classified into exceptions, relative branches, absolute branches and sync points. Since the data size for each of these sub-streams is different there is a separate FIFO for each of them.

The timing stream gets the highest priority on the read side as long as the timing and program counter data stay in the range of seven sync points. The program counter stream gets the next highest priority and the data stream gets the lowest priority. Timing packets can be sent out at any time even though there may be incomplete program counter or memory packets.

Consider the various manners of corruption. Data may be lost between the sync points or the sync points themselves may be lost. Each case requires a scheme to recover and resynchronize the trace data streams. Note that there are different processes occurring a the write side and the read side of the trace data first-in-first-out (FIFO) buffer.

Suppose data were lost in a data stream. This can happen if there was excessive data coming into the FIFO buffer but due to limited bandwidth it is not possible to export the data out of the FIFO buffer. In this case data wraps around in the FIFO buffer and gets corrupted. If only data is lost without any loss of sync points, then the read and write pointers for the FIFO buffer are reset and the fact that corruption occurred is sent out in the trace stream.

If sync points are also lost in the FIFO buffer, then coherency can be maintained by using the following technique. A sync point with a specific identifier field is guaranteed to always be in the output stream. As an example, let the value of that field be 6. If the lost sync point has an identifier value not equal to 6, it is treated exactly like a normal data corruption. The lost sync points are not resent. This saves the already limited bandwidth. If there is a sync point with an identifier value equal to 6, then this information is marked and sent over to the read side, and the read and write pointers are reset. On the read side, the finite state machine waits for this sync point of 6 in the timing and program counter trade data streams to be exported. As soon as that is achieved, the corruption information along with the data sync point with identifier of 6 is sent out. Thus, even though the data was lost, the user can still maintain coherency between the various streams.

Overflow due to excessive sync points can happen if there is sparse data but frequent sync points. The sync points in the FIFO buffer can potentially wrap around the sync point with identifier value of 6. As soon as this overflow is detected whether the FIFO buffer is full, corruption information is sent. This information is marked and sent over to the read side. The read and write FIFO buffer pointers are then reset. On the read side, the finite state machine waits for this sync point of 6 in the timing and program counter trace streams to be exported. As soon as that is achieved, the corruption information along with the data sync point with identifier of 6 is sent out. Thus, even though the data was lost, the user can still maintain coherency between the various streams.

Loss of program counter data in the stream due to sync point overflow is detected entirely on the read side. If the program counter sync point stream FIFO buffer starts falling significantly behind the timing sync point trace stream, the program counter trace stream gets higher priority. Eventually, either it will empty and the timing trace data stream will be the highest priority or the timing trace data stream will overflow. If a trade data stream other than the program counter sync point overflows, the program counter stream corruption information is sent out. Along with this stream both timing and data stream are also marked as corrupted, as sync points may have been lost in the PC sync point FIFO.

Loss of program counter data due to excessive data can happen if there are too many branches or exceptions and the system is bandwidth limited. Thus the program counter data has no opportunity to come out. This overflow is detected on the write side of the FIFO buffer. The write side in turn also marks both the timing and data streams as corrupted to ensure that sync points are not lost in the program counter FIFO buffer.

If the timing stream FIFO buffer overflows, it implies an extreme bandwidth limitation. All streams are marked corrupted.

Figure 1:
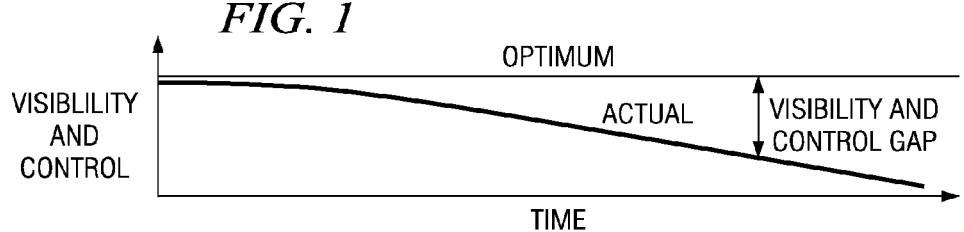
FIG. 1 illustrates the visibility and control of typical integrated circuits as a function of time due to increasing system integration.
Figure 2:
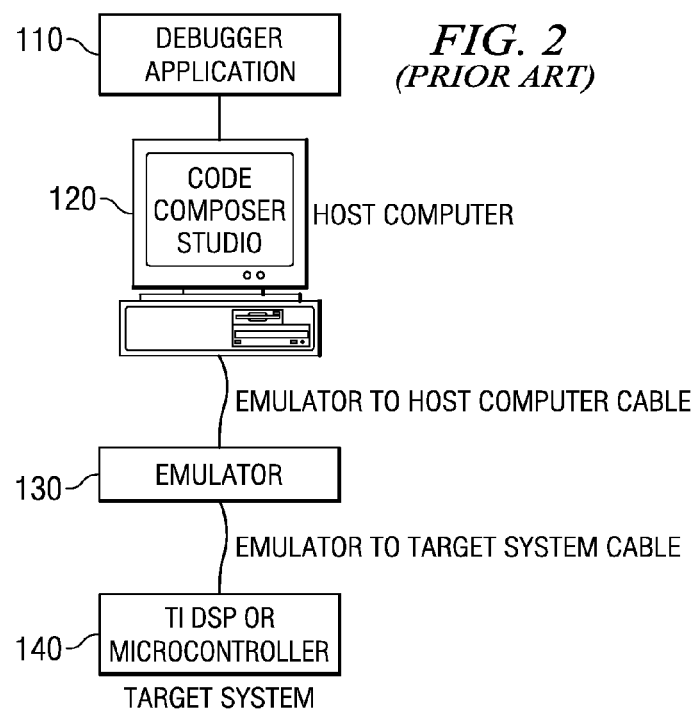
FIG. 2 illustrates an emulation system to which this invention is applicable.
Figure 4:
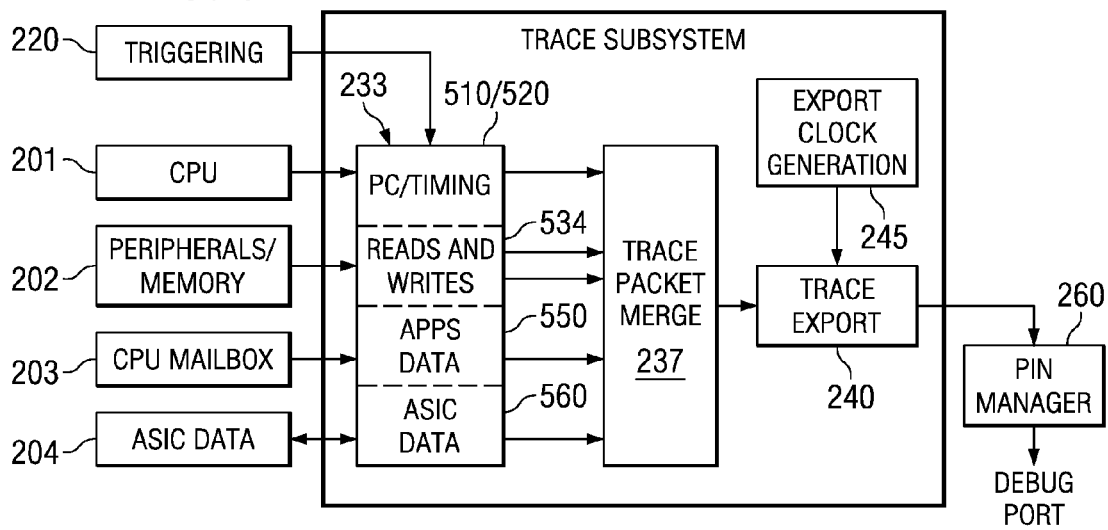
FIG. 4 illustrates in block diagram form a detail of trace subsystem.

FIG. 4 illustrates a detail of the trace subsystem. Data to be traced is generated by central processing unit core 201, peripheral and memory system 202, the central processing unit mailbox 203 and application specific integrated circuit (ASIC) data source 204. Central processing unit core 201 generates program counter and timing data. Peripherals and memory system 202 generates memory read and write access addresses and corresponding data. Central processing unit mailbox 203 generates data handled by application programs. ASIC data source 204 generates data from special purpose hardware particular to that integrated circuit. These trace data sources supply data to trace collection subunit 233. Trace collection subunit 233 includes separate sections for receipt of program counter/timing data from central processing unit 201 (sections 510/520), memory read and writes from peripheral and memory system 202 (sections 530/540), application program data from central processing unit mailbox 203 (section 550) and ASIC data from ASIC data source 204 (section 560). Trace collection subunit 233 also receives triggering signals from trigger builders 220. Trace collection subunit 233 produces plural separate data streams corresponding to the received trace data.

Trace packet merge unit 237 receives the plural trace data streams from trace collection subunit 233. Trace packet merge unit 237 merges these plural data streams into a single trace data stream. Trace packet merge unit 237 supplies this merged trace data stream to trace export 240. Trace export 240 drives pin manager 260 under timing control of export clock generator 245 (corresponding to local oscillator 245 illustrated in FIG. 3).

Figure 5:
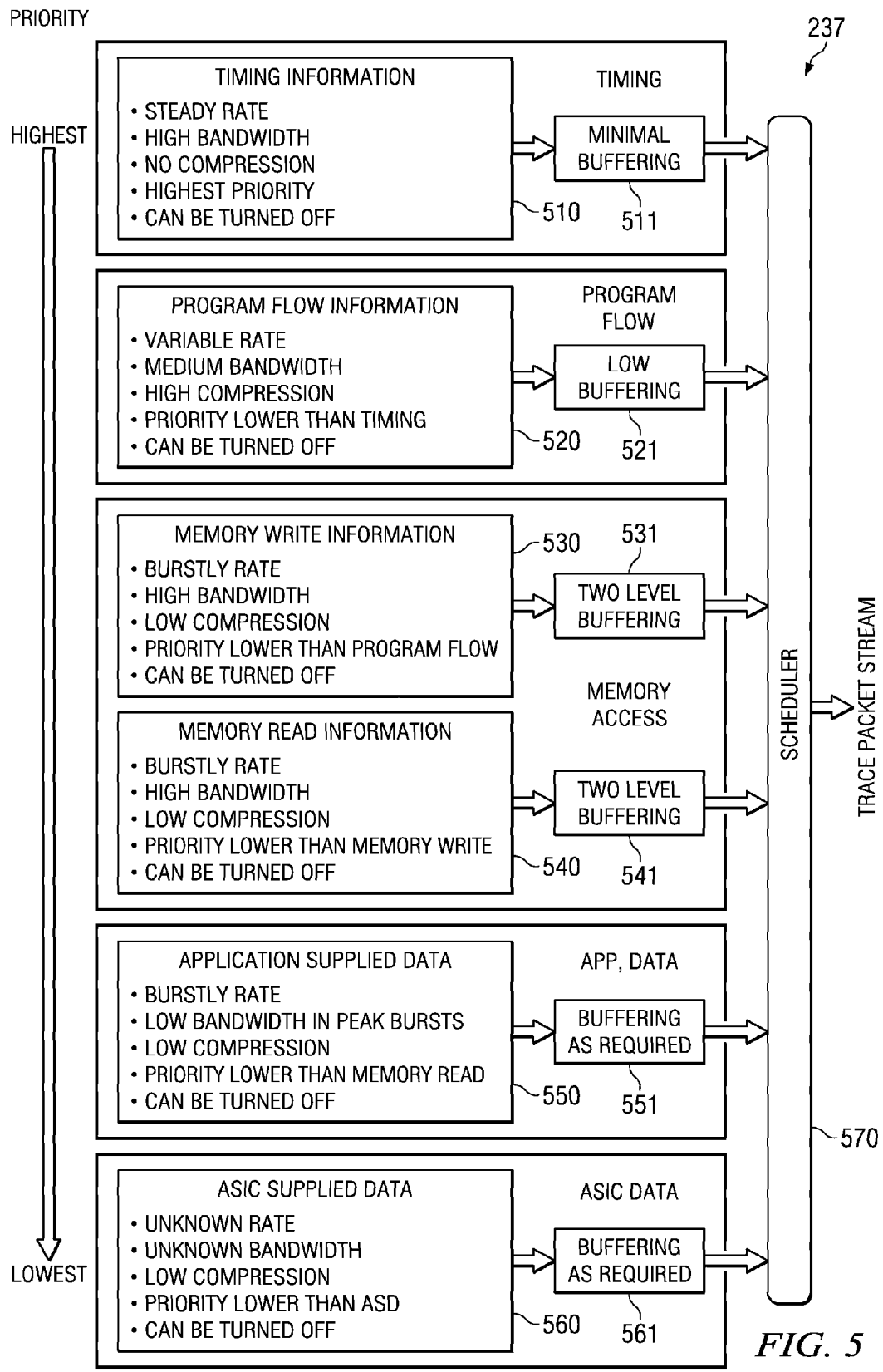
FIG. 5 illustrates in block diagram form a detail of the trace packet merge block of FIG. 4.

FIG. 5 illustrates in block diagram form a detail of the trace packet merge unit 237. FIG. 5 illustrates six separate trace data streams that must be merged for output. Timing information 510 comes from central processing unit core 201, has a steady rate and a high average bandwidth. It is typically output without compression. Trace packet merge unit 237 gives this data the highest priority. Because of its high priority, trace information 510 can be buffered in first-in-first-out (FIFO) buffer 511 with a small capacity. The high priority ensures that the small FIFO buffer 511 will not overflow.

Program counter flow information 520 also comes from central processing unit core 210. Program counter flow information 520 follows the path of program execution of central processing unit core 201. Program counter flow information has a variable rate and a medium average bandwidth. It is typically transmitted with high compression. Trace packet merge unit 237 gives this data the second highest priority just lower than timing information. The medium bandwidth and high compression require a small FIFO buffer 521.

Memory write information 530 comes from peripherals and memory system 202. The information flow occurs primarily in bursts of high activity interspersed with times of low activity. This memory write information 530 is typically transmitted with low compression. A high bandwidth is required to accommodate the bursts. Trace packet merge unit 237 gives this data an intermediate priority just lower than program counter flow information 520. The irregular rate and low compression require a large FIFO buffer 531.

Memory read information 540 also comes from peripherals and memory system 202. Memory read information 540 is similar to memory write information 530. Memory read information 540 occurs primarily in bursts of high activity interspersed with times of low activity and is generally transmitted with low compression. A high bandwidth is required to accommodate the bursts. Trace packet merge unit 237 gives this data an intermediate priority just lower than memory write information 530. The irregular rate and low compression require a large FIFO buffer 541.

Application supplied data 550 comes from central processing unit mailbox 203. It is difficult to characterize this data because it varies depending on the application program running on central processing unit 201. Application supplied data 550 is generally believed to occur in bursts with a low average bandwidth. This data is typically transmitted with low compression. Application supplied data 550 has a low priority in trace packet merge unit 237 below that of the memory write information 530 and memory read information 540. The particular application program determines the size required of FIFO buffer 551.

ASIC supplied data 560 comes from (ASIC) data source 204. The data rate, required bandwidth and required size of FIFO buffer 561 depend on the particular integrated circuit and can't be generalized. Trace packet merge unit 237 gives this data the lowest priority.

Scheduler 570 receives data from the six FIFO buffers 511, 521, 531, 541, 551 and 561. Scheduler 570 merges these separate data streams into a single trace packet stream for export via the debug port (FIGS. 3 and 4).

Figure 6A:
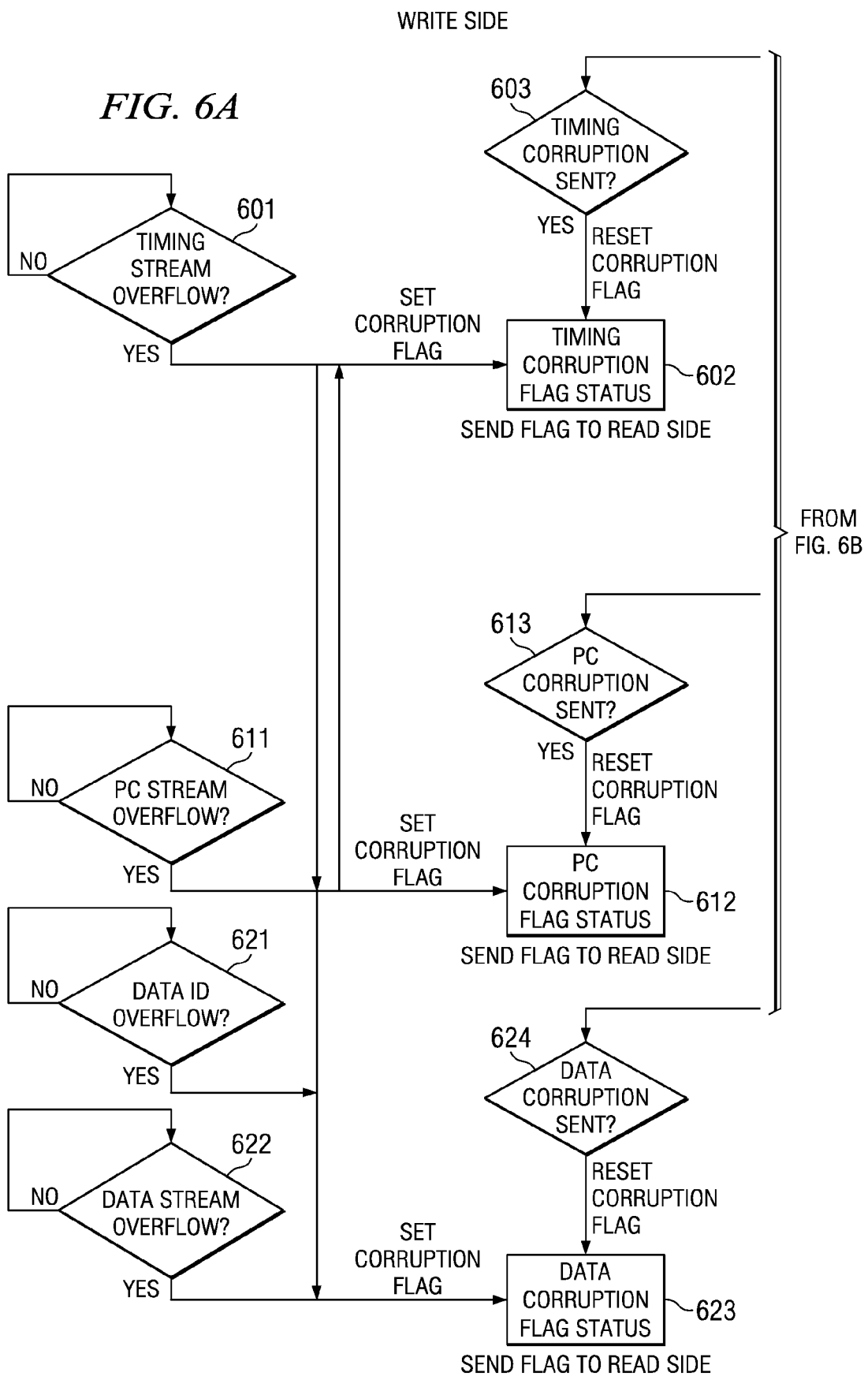
FIGS. 6A and 6B together illustrate the process of this invention in state diagram form.
Figure 6B:
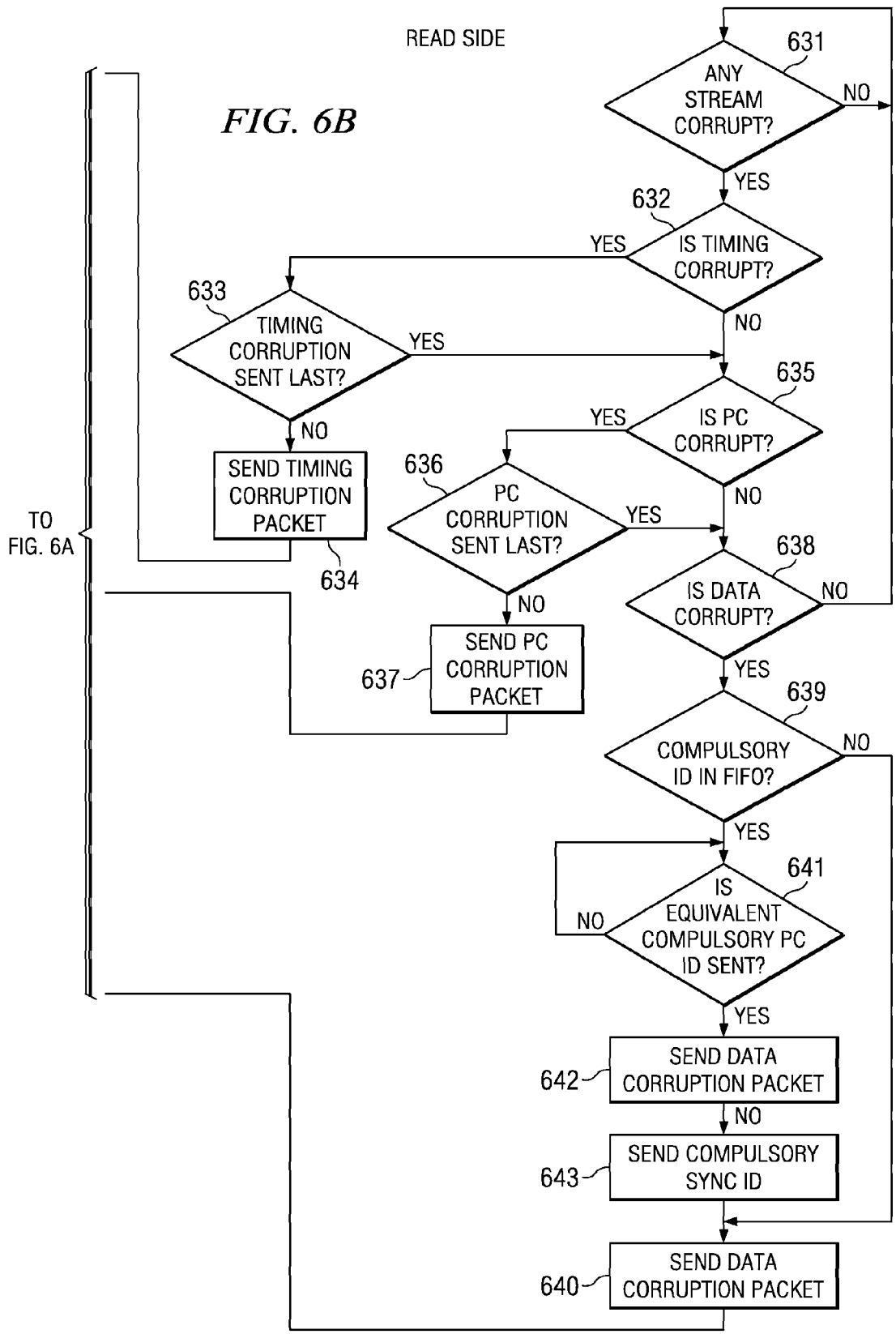

FIGS. 6A and 6B together illustrate a state diagram of the corruption handshake between the write side and the read side of trace packet merge unit 237. Corruption occurs when data in one of the six data streams listed above comes faster than the corresponding FIFO buffer is emptied. This condition is detected on the write side and must be signaled to the read side. On the write side, if the timing trace data stream overflows (Yes at decision block 601), the write side sets the timing corruption flag (Yes at decision block 601) and sends the timing corruption flag to the read side (block 602), sets the program counter corruption flag (Yes at decision block 601) and sends the program counter corruption flag to the read side (block 612) and sets the data corruption flag (Yes at decision block 601) and sends the data corruption flag to the read side (block 623). This signals the read side of the corruption. If the program counter trace data stream overflows (Yes at decision block 611), the write side sets the program counter corruption flag and the data corruption flag (Yes at decision block 611) then sends the program counter corruption flag to the read side (block 612) and sends the data corruption flag to the read side (block 623). If the data ID stream overflows (Yes at decision block 621) or the data stream overflows (Yes decision block 622), the write side sets the data corruption flag (Yes at decision blocks 621 or 622) then sends the data corruption flag to the read side (block 623).

The read side checks to determine if any trace data stream is corrupted (decision block 631). If so (Yes at decision block 631), then the read side determines if the timing trace data stream was corrupted (decision block 632). If so (Yes at decision block 632), the read side determines if a timing corruption packet was the last signal sent to the write side (decision block 633). If not (No at decision block 633), then the read side sends a timing corruption packet to the read side (block 634). On the write side decision block 603 tests to determine if a timing data corruption signal was received. If so (Yes at decision block 603), the write side resets the timing data corruption flag, then sends the timing data corruption flag to the read side (block 602). This serves to acknowledge receipt of the timing data corruption signal.

If the timing trace data stream was not corrupted (No at decision block 632) or was corrupted and the timing corruption signal was last sent (Yes at decision block 633), then the read side tests to determine if the program counter trace data stream was corrupted (decision block 635). Is so (Yes at decision block 635), then the read side tests to determine if a program counter data corruption packet was the last signal sent to the write side (decision block 636). If not (No at decision block 636), then the read side sends a timing corruption packet to the read side (block 637). On the write side decision block 613 tests to determine if a timing data corruption signal was received. If so (Yes at decision block 613), the write side resets the timing data corruption flag and sends the timing data corruption flag to the read side (block 612).

If the program counter trace data stream was not corrupted (No at decision block 635) or was corrupted and the program counter corruption signal was last sent (Yes at decision block 636), then the read side tests to determine if the trace data stream was corrupted (decision block 638). Is so (Yes at decision block 638), then the read side tests to determine if there is a compulsory ID in the FIFO buffer (decision block 639). If not (No at decision block 639), then the read side sends a trace data corruption packet to the write side (block 640). On the write side decision block 624 tests to determine if a trace data corruption signal was received. If so (Yes at decision block 624), the write side resets the trace data corruption flag and sends the trace data corruption flag to the read side (block 623). If a compulsory ID was in the FIFO buffer (Yes at decision block 639), then the read side tests to determine if a compulsory program counter ID has been sent (decision block 641). Once the compulsory program counter ID has been sent (Yes at decision block 641), the read side sends a data corruption packet (block 642), then sends a compulsory sync ID (block 643), then sends a data corruption packet (block 640). This is serviced at the write side as previously described.

What is claimed is:

1. A trace data apparatus comprising:
a timing data stream first-in-first-out buffer having an input receiving timing data from a data processor;
a data stream first-in-first-out buffer having an input receiving at least one of a program counter data stream, a data identity (ID) timing stream and a data stream from the data processor;
a trace data merge unit connected to said timing data stream first-in-first-out buffer and said data stream first-in-first-out buffer forming a combined trace data stream from the buffered timing data stream and the buffered at least one of the program counter data stream for transmission to a trace read unit, the trace data merge unit operable to
detect if said timing data stream first-in-first-out buffer overflows, and
if said timing data stream first-in-first-out buffer overflows
set a timing corruption flag, a program counter corruption flag and a data corruption flag, and
transmit an indication of the timing corruption flag, the program counter corruption flag and the data corruption flag in the combined trace data stream to the trace read unit.

2. The trace data apparatus of claim 1, further including:
a program counter data stream first-in-first-out buffer receiving the program counter data stream;
said trace data merge unit is further operable to
detect if said program counter data stream first-in-first-out buffer overflows;
if said program data stream first-in-first-out buffer overflows
set said program counter corruption flag and said data corruption flag, and
transmit an indication of said program counter corruption flag and said data corruption flag in the combined trace data stream to the trace read unit.

3. The trace data apparatus of claim 1, wherein:
said trace data merge unit is further operable to
detect if a timing corruption packet is received at a read side of the trace data merge unit; and
if a timing corruption packet is received reset the timing corruption flag, and
transmit an indication of the timing corruption flag to a write side of the trace data merge unit.

4. The trace data apparatus of claim 1, wherein:
said trace data merge unit is further operable to
detect if a program counter corruption packet is received at a read side of the trace data merge unit; and
if a program counter corruption packet is received reset the program counter corruption flag, and
transmit an indication of the program counter corruption flag to a write side of the trace data merge unit.

5. The trace data apparatus of claim 1, wherein:
said trace data merge unit is further operable to
detect if a data corruption packet is received at a read side of the trace data merge unit; and
if a data corruption packet is received reset the data corruption flag, and
transmit indication of the data corruption flag to a write side of the trace data merge unit.

6. A trace data apparatus comprising:
a timing data stream first-in-first-out buffer having an input receiving timing data from a data processor;
a data stream first-in-first-out buffer having an input receiving at least one of a program counter data stream, a data identity (ID) timing stream and a data stream from the data processor;
a trace data merge unit connected to said timing data stream first-in-first-out buffer and said data stream first-in-first-out buffer forming a combined trace data stream from the buffered timing data stream and the buffered at least one of the program counter data stream for transmission to a trace read unit, the trace data merge unit operable to
detect if a timing data stream is corrupted at a read side of the trace data merge unit;
if the timing data stream is corrupted, transmit a timing corruption packet if a timing corruption packet was not last sent to a write side of the trace data merge unit.

7. The trace data apparatus of claim 6, wherein:
said trace data merge unit is further operable to
detect if a program counter data stream is corrupted at a read side of the trace data merge unit;
if the program counter data stream is corrupted, transmit a program counter corruption packet if a program counter corruption packet was not last sent to a write side of the trace data merge unit.

8. The trace data apparatus of claim 6, wherein:
said trace data merge unit is further operable to detect if a data stream is corrupted;
  if the data stream is corrupted detect if a compulsory ID is in a data first-in-first-out buffer,
  if a compulsory ID is not in the data first-in-first-out buffer, send a data corruption packet, and
  if a compulsory ID is in the data first-in-first-out buffer, wait until an equivalent compulsory program counter ID is sent, thereafter send a data corruption packet and sending a compulsory sync ID packet.

9. The trace data apparatus of claim 6, wherein:
said trace data merge unit is further operable to detect if the timing data stream is corrupted;
  if the timing data stream is corrupted, transmit a timing corruption packet if a timing corruption packet was not last sent;
  detect if a program counter data stream is corrupted;
  if the program counter data stream is corrupted, transmit a program counter corruption packet if a program counter corruption packet was not last sent;
  detect if the data stream is corrupted;
  if the data stream is corrupted detect if a compulsory ID is in a data first-in-first-out buffer,
  if a compulsory ID is not in the data first-in-first-out buffer, send a data corruption packet,
  if a compulsory ID is in the data first-in-first-out buffer, wait until an equivalent compulsory program counter ID is sent, and thereafter send a data corruption packet and sending a compulsory sync ID packet.

10. The trace data apparatus of claim 6, wherein:
said trace data merge unit is further operable to
  detect whether a program counter data stream first-in-first-out buffer overflows and, if so,
    set a program counter corruption flag and a data corruption flag, and
    transmit an indication of the program counter corruption flag and the data corruption flag.

11. The trace data apparatus of claim 6, wherein:
said trace data merge unit is further operable to
  detect whether said data stream first-in-first-out buffer overflows and, if so,
    set the data corruption flag, and
    transmit an indication of the data corruption flag.

12. The trace data apparatus of claim 6, wherein:
said trace data merge unit is further operable to
  detect whether a timing corruption packet is received and, if so,
    reset the timing corruption flag, and
    transmit an indication of the timing corruption flag.

13. The trace data apparatus of claim 6, wherein:
said trace data merge unit is further operable to
  detect whether a program counter corruption packet is received and, if so,
    reset the program counter corruption flag, and
    transmit an indication of the program counter corruption flag.

14. The trace data apparatus of claim 6, wherein:
said trace data merge unit is further operable to
  detect whether a data corruption packet is received and, if so,
    reset the data corruption flag, and
    transmit an indication of the data corruption flag.

15. The trace data apparatus of claim 6, wherein:
said trace data merge unit is further operable to send the timing corruption packet only if a predetermined condition is satisfied.

16. The trace data apparatus of claim 15, wherein:
said predetermined condition is satisfied unless a most recent packet sent was a timing corruption packet.

17. A trace data apparatus comprising:
a timing data stream first-in-first-out buffer having an input receiving timing data from a data processor;
a data stream first-in-first-out buffer having an input receiving at least one of a program counter data stream, a data identity (ID) timing stream and a data stream from the data processor;
a trace data merge unit receiving connected to said timing data stream first-in-first-out buffer and said data stream first-in-first-out buffer forming a combined trace data stream from the buffered timing data stream and the buffered at least one of the program counter data stream for transmission to a trace read unit, the trace data merge unit operable to
  detect whether said timing data stream first-in-first-out buffer overflows and, if so,
    set a timing corruption flag, a program counter corruption flag and a data corruption flag, and
    transmit an indication of the timing corruption flag, the program counter corruption flag and the data corruption flag.

* * * * *